Patented May 3, 1949

2,469,309

UNITED STATES PATENT OFFICE 2,469,309

METHOD FOR PREVENTING ICE FORMATION ON SURFACES

Rupert C. Morris, Berkeley, and Edward C. Shokal, Oakland, Calif., assignors to Shell Development Company, San Francisco, Calif., a corporation of Delaware No Drawing. Application September 20, 1943, Serial No. 503,154

7 Claims. (Cl. 252—78)

The present invention relates to improved anti-freeze fluids for general purposes, which fluids have properties particularly adapted for use as de-icing fluids for aircraft and the like.

It has become common practice in the operation of aircraft to provide means for removing and/or preventing the formation of ice bodies on various parts of the aircraft, such ice bodies tending to form primarily on the leading edges of the propellers, wings and tail surfaces as well as on the windshield and other observation ports, when flying at high altitudes or in cold climates. A particular method generally employed at the present time for inhibition of such ice formations involves the use of de-icing fluids which are permitted to flow over those surfaces of the aircraft where ice normally forms, melting and loosening ice already formed and preventing further formation. Examples of fluids which are commonly utilized for this purpose are polyhydric alcohols, such as ethylene glycol, glycerine and mixtures of the same with water and/or other alcohols such as methyl, ethyl, isopropyl, etc.

The basic requirements for a satisfactory de-icing fluid include the following: it should have a low viscosity at icing temperatures; it should not have any deleterious effects on rubber or metals; it should be readily soluble in water. Further, de-icing fluids preferably should be non-toxic and have high boiling and flash points.

It is an object of the present invention to provide improved anti-freeze compositions meeting all of the above requirements for de-icing fluids.

The anti-freeze fluids with which the present invention is chiefly concerned include as a constituent thereof 3-sulfolanol and/or substitution products thereof which are at least about 25% by weight soluble in water. These compounds are hygroscopic solids which readily dissolve in water. They are relatively non-deleterious in their effect on rubbers and metals and have high flash points. 3-sulfolanol, for example, has a flash point of 385° F. They have the structure represented by the formula

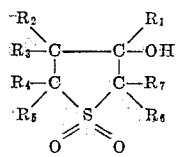

wherein $R_1$, $R_2$, $R_3$, $R_4$, $R_5$, $R_6$, and $R_7$ are hydrogen or hydrocarbon radicals having not more than 5 carbon atoms. Examples of such hydrocarbon radicals are methyl, ethyl, propyl, isopropyl, normal butyl, isobutyl, secondary butyl, tertiary butyl, normal pentyl, isopentyl, secondary pentyl, allyl, methallyl, crotyl, butenyl, pentenyl, propargyl, etc. These radicals may be substituted with other elements or groups. The preferred hydrocarbon substituents are aliphatic hydrocarbon radicals. Unsubstituted 3-sulfolanol is the preferred specific compound.

3-sulfolanol is otherwise named 3-hydroxy cyclotetramethylene sulfone. It can be prepared by reacting water with 3-sulfolene (which is also known as 3-thiolene-1,1-dioxide or betabutadiene sulfone), or to 2-sulfolene (which is also known as 2-thiolene-1,1-dioxide or alpha-butadiene sulfone), in the presence of an alkali. The preparation of the sulfolenes is described in part in British Patent 361,341; German Patent 236,386; German Patent 506,839; and by Backer and Strating in Rec. trav. chim., 53, 525–543 (1934).

The 3-sulfolanols (by which is meant 3-sulfolanol and its substitution products, as designated above) may be employed in combination with various other components in varying quantities in order to prepare the desired anti-freeze compositions. The amount of 3-sulfolanols to be used for the purpose of the present invention may be varied over a wide range depending upon the particular type of anti-freeze fluid desired, the other components of the composition and its intended use. In blends with water, for example, as little as 10% by weight of 3-sulfolanol will appreciably depress the freezing point of the water, the lowest freezing point being obtained with a blend consisting of 80% by weight of 3-sulfolanol and 20% by weight of water. No advantage is derived in utilizing more than approximately 88% by weight of 3-sulfolanol in an aqueous blend as the freezing point of such blends is higher than that of water alone. For many purposes it will be found that blends of 3-sulfolanol and water are eminently suitable for de-icing purposes, the preferred amounts of 3-sulfolanol ranging from approximately 70% to approximately 85% by weight of the blend. As a specific example of a suitable de-icing fluid, the following may be cited:

A blend consisting of 80% by weight of 3-sulfolanol and 20% by weight of water was prepared. This blend was found to have a freezing point of —27.9° C. and a viscosity of approximately 20 Centistokes at 0° C. A blend consisting of 80% by weight of glycerol and 20% by weight of water has a freezing point of —20.3° C. and a viscosity of 40 Centistokes at 25° C.

For many purposes it will be found to be desirable to include a quantity of an organic diluent in preparing anti-freeze fluids according to the present invention. Particularly suitable and preferred diluents are those mono- and polyhydric alcohols which are appreciably soluble in water, as for example, methyl, ethyl, propyl, isopropyl, butyl, and isobutyl alcohols, ethylene glycol, propylene glycol, trimethylene glycol, alpha and beta butylene glycol, butandiol-1,3, tetramethylene glycol, isobutylene glycol, pinacol glycerol, sorbitol, mannitol, penta-erythritol, polyvinyl alcohol, adonitols, arabitols, etc.

Specific examples of anti-freeze fluids containing alcohols are set forth in the following table:

Table I

| Blend No. | Wt. Percent 3-sulfolanol | Wt. Percent Alcohol | Wt. Percent Water | Freezing Point, °C. |
|---|---|---|---|---|
| 1 | 85.0 | 5.0 | 10.0 | −31.4 |
| 2 | 80 | 5.0 | 15.0 | −31.0 |
| 3 | 80 | 5.0 | 15.0 | −25.0 |

Ethyl alcohol was employed in blends 1 and 2 and isopropanol was employed in blend 3.

The freezing points of various other blends containing 3-sulfolanol in comparison with a eutectic glycerol-water solution are given in the following table:

Table II

| Blend No. | Glycerol, Wt. Percent | 3-Sulfolanol, Wt. Percent | Ethylene Glycol, Wt. Percent | Water, Wt. Percent | Freezing Point, °C. |
|---|---|---|---|---|---|
| 1 | 66.7 | | | 33.3 | −46.5 |
| 2 | 50.0 | 25.0 | | 25.0 | −52.0 |
| 3 | 33.3 | 50.0 | | 16.7 | −75.0 to −85.0 |
| 4 | | 63.7 | 29.0 | 7.3 | −75.0 to −85.0 |
| 5 | | 72.3 | 14.1 | 13.6 | −75.0 to −85.0 |

From the above table it will be seen that the addition of 25% by weight of 3-sulfolanol lowers the freezing point of a glycerol-water eutectic solution by 5.5° C., while the addition of an equivalent weight of 3-sulfolanol lowers the freezing point 30° C. It will also be noted that blends of 3-sulfolanol and water with a diluent, such as ethylene glycol, may be prepared which have freezing points below −75° C.

If desired, an alcohol or mixture of alcohols may be used without water as solvent for the 3-sulfolanol.

It will be realized that the particular quantities of the various components to be used will depend largely upon the particular use for which the anti-freeze fluid to be prepared is intended. In general, it will be found that a compound or mixture of compounds selected from the group consisting of 3-sulfolanol and its substitution products in amounts ranging from approximately 10% by weight to approximately 90% by weight of the finished blend may be incorporated with a compound or mixture of compounds selected from the group consisting of water and water soluble mono- and polyhydric alcohols in amounts ranging from approximately 90% by weight to approximately 10% by weight of the finished blend.

In some instances, particularly wherein relatively large quantities of water are included in the blended composition, it will be found desirable to incorporate small amounts of a corrosion inhibitor. Many water and/or alcohol soluble corrosion inhibitors will be found satisfactory for this purpose, such as, for example, sodium nitrite, sodium silicate, sodium chromate, sodium phosphate, sodium carbonate, nitrite salts of organic nitrogen base compounds, such as trimethylcyclohexylamine nitrite, aromatic diamines with or without other non-amino substances such as alkaline salts and fatty acids, etc. The quantity of inhibitor to be added will, of course, depend upon the particular inhibitor employed and will in general amount to less than approximately 3% by weight of the blended composition.

We claim as our invention:

1. In a method for preventing ice formation on surfaces exposed to ice forming conditions the step comprising wetting said surfaces with a homogeneous fluid having a freezing point below 0° C., said homogeneous fluid consisting of between approximately 10% by weight and approximately 90% by weight of 3-sulfolanol and the remainder being substantially material selected from the group consisting of water, water-soluble alcohols, and mixtures thereof.

2. In a method for preventing ice formation on surfaces exposed to ice forming conditions the step comprising wetting said surfaces with a homogeneous fluid having a freezing point below 0° C., said homogeneous fluid consisting of between approximately 10% by weight and approximately 90% by weight of 3-sulfolanol in water.

3. In a method for preventing ice formation on surfaces exposed to ice forming conditions the step comprising wetting said surfaces with a homogeneous fluid having a freezing point below 0° C., said homogeneous fluid consisting of between approximately 10% by weight and approximately 90% by weight of 3-sulfolanol and the remainder being substantially an aqueous alcohol solution.

4. The method according to claim 3 wherein said alcohol is a monohydric alcohol.

5. The method according to claim 3 wherein said alcohol is a polyhydric alcohol.

6. The method according to claim 3 wherein said alcohol is glycerol.

7. The method according to claim 3 wherein said alcohol is ethylene glycol.

RUPERT C. MORRIS.
EDWARD C. SHOKAL.

REFERENCES CITED

The following references are of record in the file of this patent:

UNITED STATES PATENTS

| Number | Name | Date |
|---|---|---|
| 1,565,323 | Haak | Dec. 15, 1925 |
| 1,926,766 | Englund | Sept. 12, 1933 |
| 2,017,593 | Geer | Oct. 15, 1935 |
| 2,078,534 | Groll et al. | Apr. 17, 1937 |
| 2,091,395 | Perrin | Aug. 31, 1937 |
| 2,094,564 | Schenck et al. | Sept. 28, 1937 |
| 2,219,006 | Delfs | Oct. 22, 1940 |
| 2,233,185 | Smith | Feb. 25, 1941 |

FOREIGN PATENTS

| Number | Country | Date |
|---|---|---|
| 481,674 | Great Britain | Mar. 15, 1938 |
| 336,739 | Great Britain | Oct. 23, 1930 |

OTHER REFERENCES

Rec. Trav. Chim., vol. 62 (1943), in French, Backer et al., pp. 815–823.